Daniel D. Newman,
Harold A. Rosen,
INVENTORS.
BY.

ALLEN A. DICKE, Jr.,

AGENT.

July 14, 1970  D. D. NEWMAN ET AL  3,520,137
ROCKET APPARATUS EMPLOYING ELECTROLYSIS
Original Filed Feb. 27, 1967  4 Sheets-Sheet 4

Daniel D. Newman,
Harold A. Rosen,
INVENTORS.
BY

ALLEN A. DICKE. Jr.,
AGENT.

United States Patent Office
3,520,137
Patented July 14, 1970

3,520,137
ROCKET APPARATUS EMPLOYING ELECTROLYSIS
Daniel D. Newman, Cincinnati, Ohio, and Harold A. Rosen, Santa Monica, Calif., assignors to Hughes Aircraft Company, Culver City, Calif., a corporation of Delaware
Original application Feb. 27, 1967, Ser. No. 618,651. Divided and this application Nov. 1, 1968, Ser. No. 772,676
Int. Cl. B63h 11/00; F02k 7/00, 9/06
U.S. Cl. 60—221                                    10 Claims

ABSTRACT OF THE DISCLOSURE

The rocket propulsion apparatus employs propellant which is stored as a liquid and which is electrolyzed to generate gaseous propellant as needed. The gas is either burned in an engine or employed in the cold gas technique. The generated gas can also provide pressure to feed liquid propellant to an engine.

CROSS REFERENCE

This is a division of application Ser. No. 618,651 filed Feb. 27, 1967, which in turn is a continuation-in-part of application Ser. No. 542,709 filed Apr. 8, 1966, now abandoned, which was, in turn, a continuation of application Ser. No. 374,012 filed June 10, 1964, now abandoned.

BACKGROUND

This invention relates primarily to a thrust producing system and in a preferred embodiment to a spacecraft reaction control system for imparting the small impulses needed over long periods of time for making fine adjustments in its orbit.

Many spacecraft require an internal propulsion system which is capable of frequent firing or pulsing for short time durations over a long mission lifetime of weeks, months, or even years. Synchronously orbiting communication satellites, for example, require a propulsion system to correct for the variations in its orbit due to the apparent east-west drift perturbation resulting from the triaxiality formed by the non-spherical distortion of the earth and also due to the north-south inclination changes resulting from solar and lunar gravitational effects.

Previously available propulsion systems for spacecraft impart the required impulses by the decomposition of liquid monopropellant such as hydrogen peroxide or hydrazine in a combustion chamber and by expelling the resulting gaseous products of decomposition through a nozzle. Stability of monopropellants is limited and slow decomposition limits the useful mission lifetime. The specific impulse (ratio of developed thrust to propellant consumption rate) is low; therefore, for a given thrust, consumption of propellant is high. Propulsion systems are being developed for orbital vehicles which employ separately stored liquid fuel and oxidizer. The two fluids are brought together in a combustion chamber and react on contact. In the small engine sizes required for orbital vehicles, the proper injection and mixing of liquid propellants requires extreme precision in the manufacture of injectors. The small holes are subject to clogging by particles, gums, or sludges. Specific impulses of these systems are higher than with a monopropellant. Long term storage of these propellants during an extended mission is questionable as they are corrosive and tend to sludge. The use of gaseous propellants eliminates many of the problems associated with liquid propellants; however, the storage of pressurized gas in quantities needed to perform long term missions results in excessive tank weight, and this type of system is subject to the disadvantages of gas leakage, and low performance toward the end of the mission when the gas pressure is reduced.

SUMMARY

In order to aid in the understanding of this invention, it can be stated in essentially summary form that it is directed to a rocket apparatus which employs electrolysis. A vessel stores electrolyzable liquid. Electrodes are in contact with the liquid so that upon the application of current therebetween, the liquid is electrolyzed to produce a gas. This gas pressurizes the vessel. The pressurized gas is used to expel the liquid, or to expel the gas in cold gas expulsion or for burning of the gas as it is expelled (if the gas is combustible). The apparatus may be arranged to operate in several of these modes, if desired.

It is a primary objective of the present invention to provide a thrust producing system which is capable of frequent firing for short time durations over a long mission lifetime. Another object of this invention is to provide a propulsion system which stores a propellant in an inert, stable fluid state for long time periods. Yet another object is to provide a propulsion system which generates a pressurant from a stored inert stable fluid and which utilizes the pressurant for propellant expulsion.

Still another object is to provide a propulsion system which generates a high energy propellant as needed for intermittent propulsion over a long time period or mission lifetime. Still another object is to provide a propulsion system of the above type which can operate under zero gravity or near zero gravity conditions for extended periods of time. Yet another object is to provide a propulsion system characterized by the structural simplicity of monopropellant systems and the high performance of bi-propellant systems.

Yet another object is to provide a propulsion system which collects and stores solar energy as electrical and chemical energy for later utilization of the chemical energy at high rates of expenditure. Another object is to provide a highly reliable bi-propellant system in which the mixture ratio of the propellant cannot shift and the response time is fast and thrust can be accurately and easily controlled. Still another object is to provide a propulsion system which requires decreasingly amounts of power to operate as mission time increases.

These and other objects are accomplished according to a preferred embodiment of the present invention in which the thrust producing system is incorporated in a satellite by subjecting a quantity of water and potassium hydroxide stored within an enclosed chamber to electrolysis, to evolve or generate the high energy bi-propellant comprising hydrogen and oxygen gases which are stored under pressure until needed. Then, upon command, the stored bi-propellant gases are fed to an engine and ignited to provide thrust for accurately controlled short time durations while at the same time flashback of the ignited gas into the propellant storage portion of the system is prevented. Once the stored gas falls below a certain level and/or once it is again necessary to produce thrust, the electrolysis action is again initiated and continued until the necessary gas pressure is obtained.

In another preferred embodiment of the invention, the generated hydrogen and oxygen gases are employed as a propellant by means of the cold gas technique (they are expelled from a nozzle without burning). In still another embodiment of the invention, the electrolyzable material is not water but is a propellant in the liquid state and is used as such when it is desired to produce higher amounts of thrust (the liquid is fed to its engine under pressure of the generated gas) but which is electrolyzed to generate gases which are used to produce relatively smaller amounts of thrust by either burning the gases or using them in the cold gas technique.

These and other objects and advantages of the present invention will be more fully understood by reference to the following description, the claims and the attached drawings.

DESCRIPTION

Figure 1:
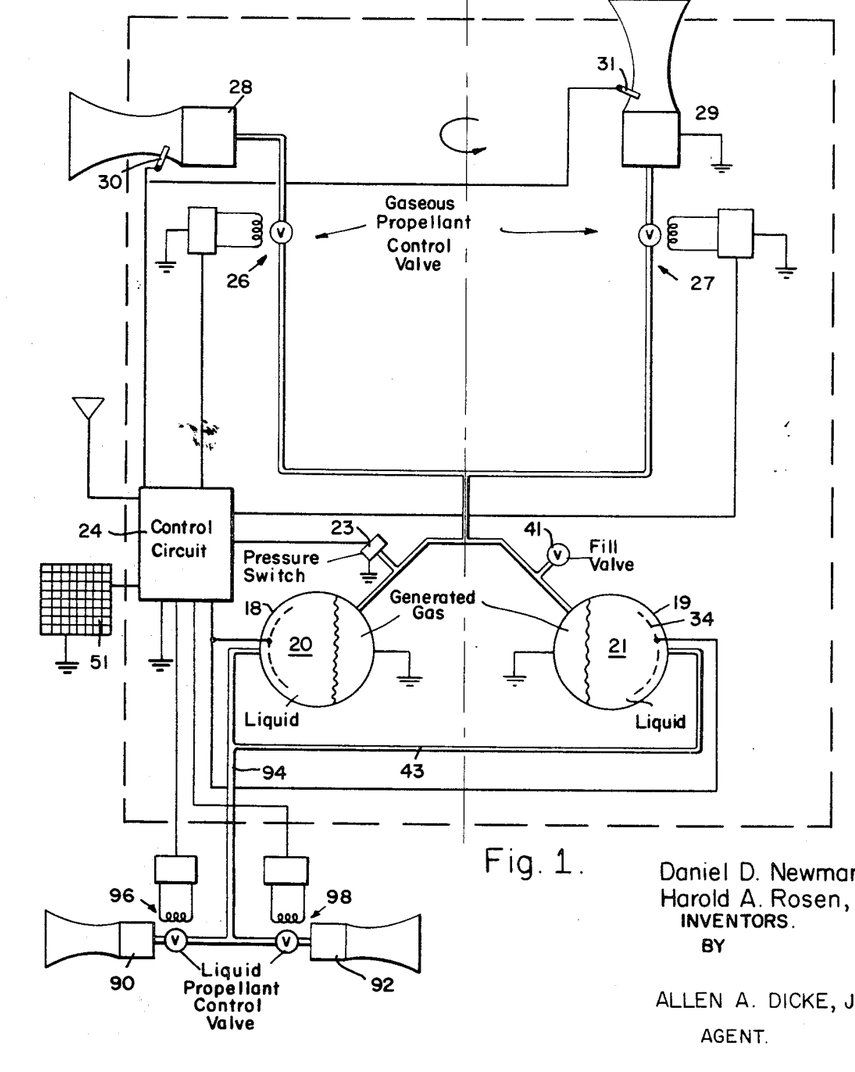
FIG. 1 is a schematic diagram which illustrates the basic principles of the present invention.

FIG. 1 illustrates a hybrid system of the present invention. This system comprises a pair of spherical tanks 18 and 19 defining enclosed spherical chambers 20 and 21 for storing propellant in the liquid state. The chambers 20 and 21 in addition to being storage chambers are also electrolytic cells since the liquid propellant is subjected to electrolysis to generate gases in the chambers 20 and 21. The hybrid system shown in FIG. 1 includes a pair of engines 28 and 29, of the type which use gaseous propellant, connected to the gas ullage space in the chambers 20 and 21 and a pair of engines 90 and 92, of the type which use liquid propellant, connected to the portion of the tanks 18 and 19 containing the liquid propellant.

In the hybrid system the preferred material for use in the chambers 20 and 21 includes such materials as hydrogen peroxide and hydrazine. The hybrid system allows the integration of a conventional hydrogen peroxide system and the electrolysis system of the present invention into a single system which can both burn the hydrogen peroxide directly for high thrust and electrolyze it and burn the resulting gases. The eventual decomposition of hydrogen peroxide, to water, after years in space does not disable the system as the water is then electrolyzable along with the residual peroxide. This system also does not rely on stored pressured nitrogen gas to feed the hydrogen peroxide to its engines as it makes its own pressurized gas by electrolysis. This hybrid system eliminates the disabling of a system due to leakage of gas and also eliminates the low performance of prior systems toward the end of the mission when the nitrogen gas has expanded to low pressures. The hybrid system, or dual mode operation, is also available using hydrazine. The difference between the hydrogen peroxide gas and the hydrazine gas is that the gas generated by electrolysis using hydrazine does not burn so that its use is limited to use in the cold gas technique and it is limited in that hydrazine decomposes into ammonia instead of water.

Once a predetermined gas pressure is obtained, a pressure switch 23 is actuated which signals a control circuit 24 to stop the electrolyzing action, for example, by disconnecting the power supply from the electrolyzing electrodes. Separate command signals from the control circuit 24 are in turn used to selectively open a pair of normally closed electromagnetic or solenoid propellant control valves 26 and 27 to allow the generated gas to flow to the reaction engines 28 and 29 respectively. When using a material in the chambers 20 and 21, the generated gas of which is combustible, at the same time that the solenoid valves 26 and 27 are opened, a pair of spark plugs 30 and 31 in each of the engines 28 and 29, respectively, are energized to ignite the gases in the engine combustion chamber thereby developing a reaction force through each engine nozzle. If the apparatus were designed specifically for use in the cold gas technique (i.e. with a gas which does not burn), the spark plugs 30 and 31 and the corresponding portion of the control circuit 24 would be eliminated from the design. However, the cold gas technique could be used with engines designed specifically for use with gases which do burn. The pair of engines 90 and 92 are supplied with liquid propellant from the chambers 20 and 21 via a feed line 94 which taps into an equalizing line 43. The liquid propellant is controllably fed to the engines 90 and 92 by means of a pair of solenoid actuated propellant control valves 96 and 98. The valves 96 and 98 are actuated by signals received from the control circuit 24.

Figure 2:
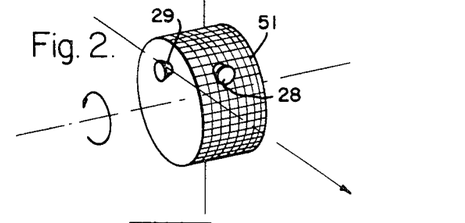
FIG. 2 is a perspective view of a synchronously orbiting spinning satellite showing an engine arrangement.

When the gas engines (or the liquid engines or both) of FIG. 1 are utilized for the station keeping of a synchronously orbiting satellite (FIG. 2), one engine 29 would be directed along the satellite spin axis preferably radially displaced therefrom while the other engine 28 would be directed radially outward of the spin axis preferably in the plane of the center of gravity of the satellite. Thus, the axially directed engine 29 would be energized in a somewhat steady manner to overcome the effects of solar and lunar gravitational attraction on the satellite. The radially directed engine 29 would in turn be pulsed periodically during a predetermined segment or sector of satellite spin to overcome east-west drift. A spinning satellite is usually placed into orbit in a spinning condition by action of the final stage of the launch vehicle. However, the rocket engines of the present invention can be used the establish, maintain and control the spin of a spinning satellite.

Figure 3:
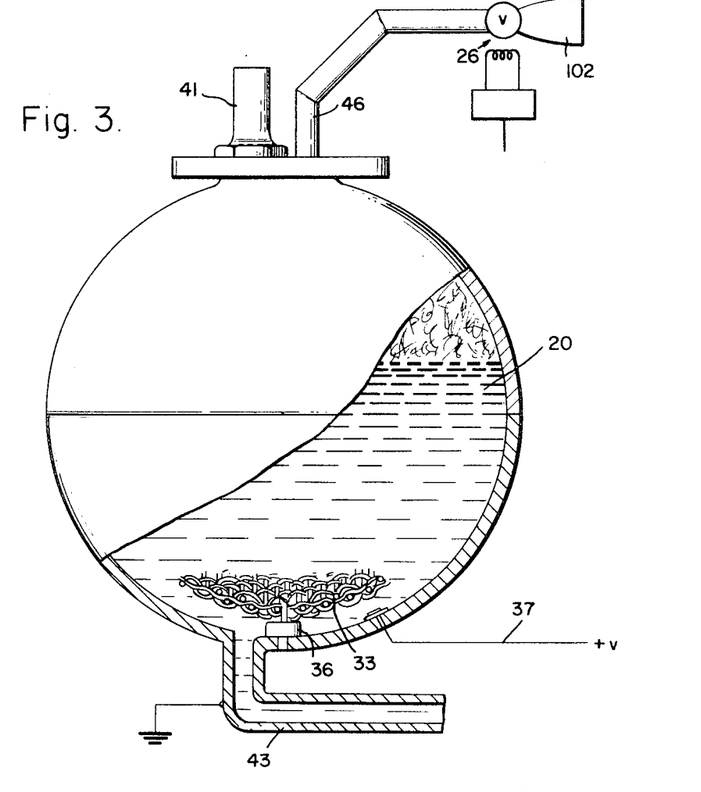
FIG. 3 is a partly cross-sectional, partly elevational view of the propellant generating tank of FIG. 1.

Referring back to the spherical electrolysis tanks of FIG. 1 in more detail, each tank is symmetrically arranged about a central spin axis (see the arrow in FIG. 1) so that the material contained within the chambers is centrifugally forced radially outward of the spin axis. Each chamber is made of carbon steel or other equivalent high tensile strength electrically conductive material and can be nickel plated to eliminate the problems of oxidation. Each chamber includes a concentric, cupped, electrolyzing anode electrode 3 and 4 respectively, each of which is made of a nickel wire mesh or screen and are spaced from the chamber wall at the radially outermost portion thereof by an electrically insulating bushing or mounting 36 (FIG. 3). An electrical current supply lead 37 extends through the wall of the spherical chamber 21 to supply current to the anode electrode 33 at a potential positive relative to a ground or reference potential. The spherical tank is in turn connected to a ground terminal, thereby providing a cathodic electrode surface relative to the anode screen electrode 33. As current is supplied to anode electrode 33 bubbles of gas are generated at the surface of the anode and the cathode. These lightweight bubbles of gas escape to a ullage space which is diametrically opposite the anode 33 and slowly build up a reservoir of pressurized gas within the chamber.

Liquid material is initially added to the spherical chamber through a fill valve 41 which can be of the type having a spring pressure and internal air pressure seated valve stem. One commercially available type of valve which can be used is the Deutsch Company's fill and drain quick disconnect Model DQC, illustrated in Catalog No.

DH-62004, printed August 1961. The tank is not completely filled, as space must be left for generated gas.

Referring back to FIG. 1, weight balance about the spin axis is effected by the equalizing line 43 connected to communicate between the radially outermost ends of the two spherical chambers 20 and 21 so that liquid transfers from one tank to the other by centrifugal force when they become unbalanced. Some advantages of this equalization is the tendency to correct for any spin imbalance in the satellite while insuring that one chamber will not run dry before the other in situations where one of the electrolyzers consumes liquid faster than the other.

Once enough gas has been generated such that the pressure of the generated gas in the ullage space and in the gas manifold 46, which is connected through each of the tanks 18 and 19 at an inner-upper wall portion, reaches a predetermined pressure sufficient to close the pressure switch 23, the control circuit 24 in response to the closing of switch 23 stops the electrolyzing action. Thereafter, the generated gas will remain in the ullage space under pressure until such time as it is needed.

Figure 5:
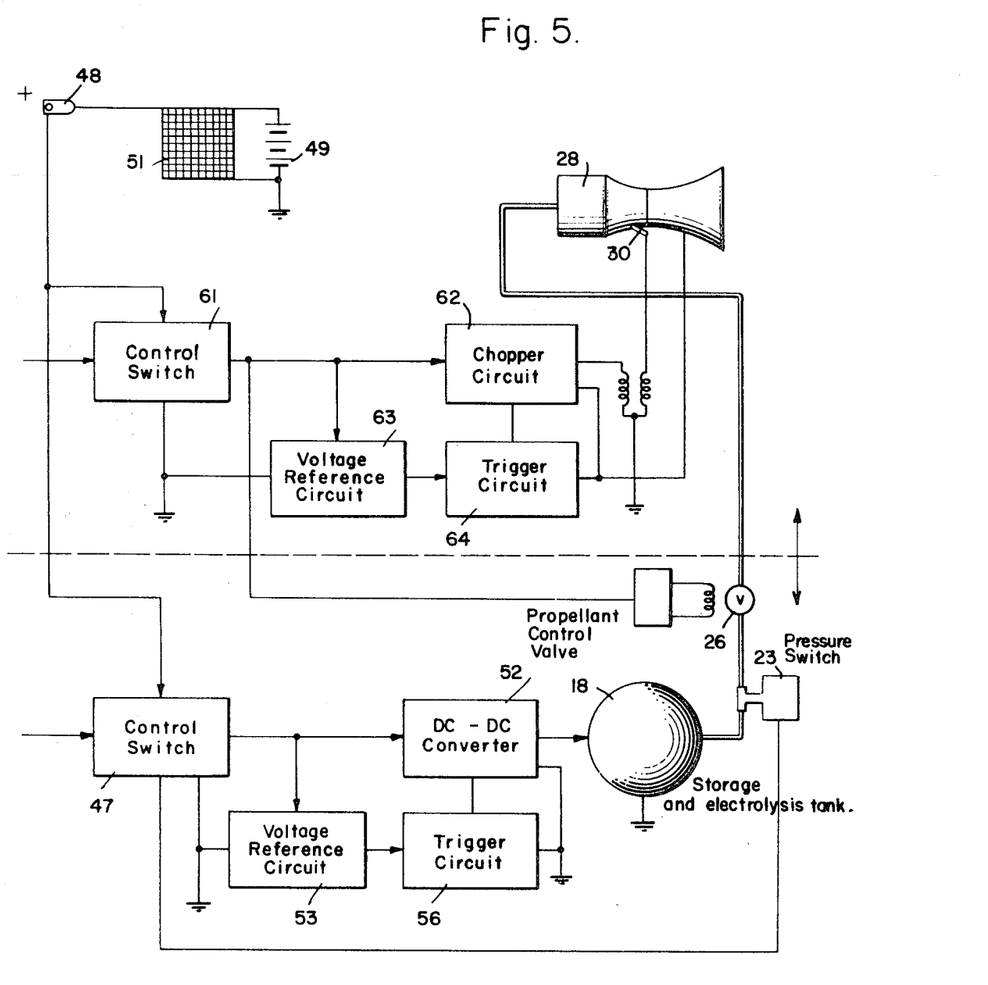
FIG. 5 is a schematic electrical block diagram of a portion of the electrical control system pertaining to one of the propulsion engines of FIG. 1.

The above described electrolysis operation can be readily accomplished by an electrical control circuit, of the type illustrated in FIG. 5. Subsequent to the start of the mission, a control signal is transmitted to a command circuit (not shown) to actuate a control switch 47, thereby initiating the flow of electrolyzing current to the storage and electrolyzing tank 18. This command circuit can be of any conventional well-known type such as that being used in the SYNCOM Satellite manufactured by Hughes Aircraft Company. Actuation of the control switch 47 conducts energy from a power supply terminal bus 48 which includes a DC storage battery 49 which is in turn connected in circuit with a solar cell panel 51. This solar cell panel can be any conventional type such as the type used in the above referenced Hughes SYNCOM Satellite and consists of a plurality of silicon N on P flat rectangular cells each capable of generating electric energy of a half volt and 50 milliamps. By connecting these cells in series columns to raise the voltage and the columns in parallel to increase the current, sufficient power is generated to operate the circuit.

The control switch 47 is essentially a conventional electromechanical or electronic switch used to apply the DC power to a DC-DC converter 52 which, in turn, provides a constant current variable low voltage (around 2 volts) output for electrolysis of a liquid in the tank 18. This DC-DC converter can be of a conventional type such as described on p. 439 of "Transistor Circuit Design" edited by the engineering staff of Texas Instruments, Inc. and published by McGraw-Hill Book Company. For circuit operating stability a voltage reference circuit 53 is connected to receive the power signal from the output of the control switch 47 and provide a stable reference voltage for close frequency control of a trigger circuit 56. The voltage reference circuit 53 can be a conventional type such as described in Fig. 9–8 on p. 153 of the above referenced "Transistor Circuit Design " book. The trigger circuit 56 receives the reference voltage and provides isolation between the voltage reference circuit and the DC-DC converter 52, thereby assuring stable and reliable operation of the converter under all load conditions. One type of trigger circuit which could be used would be a Schmitt trigger illustrated on p. 169, Fig. 11.10 of the General Electric Transistor Manual, edited by General Electric, 6th ed. The output from the trigger circuit 56 is connected to externally trigger the DC-DC converter so that a rectified constant current (about 2 amps) is supplied to the anode electrode 33.

A pressure-sensitive switch 23 is connected to sense the gas pressure and effect electrolysis only when the pressure drops below a predetermined level. Pressure switch 23 can be any conventional diaphragm type which actuates a microswitch or limit switch when the pressure exerted on one side of the diaphragm exceeds a predetermine threshold level. When the pressure switch is actuated, the control switch 47 is open circuited to de-energize the DC-DC converter and stop electrolysis. When the gas pressure drops below a predetermined threshold level, however, the pressure switch 23 is deactuated to again switch on the control switch 47 to apply current to the DC-DC converter 52 to again initiate electrolysis. This cycle is continued throughout the life of the mission.

When propulsion forces are desired, either one or both of the fast-acting solenoid valves 26 and 27 of FIG. 1 are selectively energized thereby releasing the pressurized gases for flow into an engine such as into the combustion chamber of the engine 28 or 29. These valves can be any commercially available solenoid type valve which has a fast opening time on the order of two to eight milliseconds.

In another preferred embodiment of the invention the electrolyzable liquid which is used is water. All of the apparatus shown in FIGS. 1–8 is applicable for use in a system using water for fuel with the exception of the engines 90 and 92 and associated equipment in FIG. 1. Water is not useful in the hybrid system since it is not a propellant in the liquid form as is hydrazine and hydrogen peroxide. With water, however, the option of either igniting the gnerated gases (by means of catalysts, glow plugs, or spark plugs) or using them in the cold gas technique is available. The same engine (28 and 29 in FIG. 1) can be used for either method of gas propulsion; combustion chamber and spark plug merely being surplusage in the cold gas technique.

When water is employed in the spherical chamber 20, bubbles of oxygen gas ($O_2$) are generated at the surface of the anode while bubbles of hydrogen gas ($H_2$) are generated on the cathodic wall of the chamber 20. These bubbles slowly build up a supply of pressurized intermixed hydrogen and oxygen gas within the chamber.

Some advantages of using water as a propellant are that it is a stable inert fluid which does not form gum or sludges during long storage periods and does not require super-insulations for storage or boil-off. In addition, water has a high density compared to many propellants while the oxygen and hydrogen gases which are evolved are high performance propellants when burner or ignited in the engine.

In order to aid the electrolysis action on the water, an electrolyte such as potassium hydroxide is added to the water to set up an electrolyte concentration of 0.4 normal, that is, 0.4 gram mole per liter. As the water is used up for gas generation, the concentration of the potassium hydroxide (KOH) increases. As the concentration so increases, less power is needed to generate a predetermined quantity of gas. As a result, this system has the advantage of requiring less power to operate as the mission life increases, thereby increasing the reliability of the system to compensate for againg or deterioration of the power source or solar cell array 51.

Figure 4:
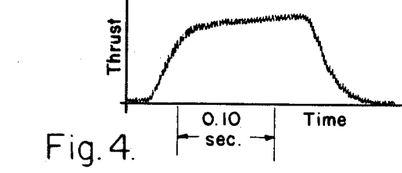
FIG. 4 is a graphical illustration of a predictable propulsion pulse waveform.

During the storage times, the two gases have an exact mixture ratio of 8:1, as fixed by the composition of water. As a result, mixture ratio shifts are not possible with this system, thereby insuring a constant high specific impulse of around 360 seconds; that is, a constant thrust per pound of propellant burned per second. In addition, the hydrogen and oxygen gas mixture is easily ignited, resulting in a fast transient response, is smooth and rapid burning, requires low combustion pressures, and does not form solids or residues. As a result, the engine life is quite long and the operation quite reliable over extended time periods. As a result of these characteristics, pulses having the highly predictable waveform such as the pulse graphically illustrated in FIG. 4, are generated.

Figure 6:
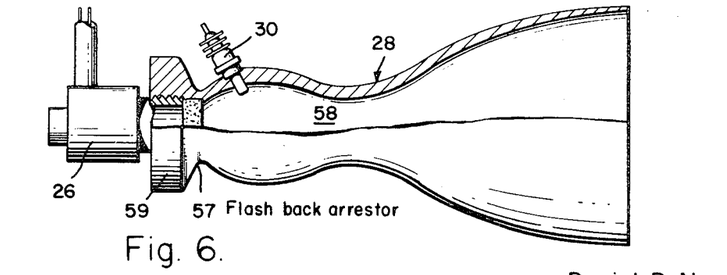
FIG. 6 is a side elevational view of a propulsion engine illustrated partly in cross section to show the relationship of an ignition spark plug and combustion chamber with a porous flashback arresting plug.

FIG. 6 illustrates an engine of the type in which the gas mixture generated from the electrolysis of water is fed into a combustion chamber and ignited. With the solenoid valve 26 open, the gaseous propellant flows through a porous flashback prevention plug 57 into a combustion chamber 58 of the engine 28. The engine 28 is of a thin wall diverging nozzle design and can be made of oxygen-free copper. A heat sink 59 comprising a large mass of metal is formed at the inlet end of the engine for receiving and storing heat from the nozzle, thereby preventing excessive temperatures in the porous plug 57, gas manifold 46, or the solenoid valve 26. The spark plug 30 is threadably connected through the thin wall portion of the engine 28 to communicate with the combustion chamber 58. The electrodes of this spark plug 30 are approximately flush with the combustion chamber wall to aid rapid ignition of the gas and insure long electrode life in this particular embodiment. Spark plug 30 can be a Champion Model V-2 or its equivalent.

At the same time that the propellant control valve 26 is opened a high voltage AC signal is supplied to the spark plug 30. A command signal from the conventional telemetry circuit (not shown) closes a control switch 61 of FIG. 5, thereby supplying electrical power to the propellant control solenoid valve 26 and a chopper circuit 62. Control switch 61 can be of any conventional electromechanical or electronic type and merely conducts the DC power supply current to the chopper 62 and propellant control valve 26. The chopper 62 in turn can be any conventional free-running vibrator such as the type described in Fig. 10.7 on p. 173 of the previously referenced "Transistor Circuit Design." Frequency ranges for the AC output of this chopper would be from 3 to 10 kilocycles. For circuit stability of the chopper 62, a reference circuit including a voltage reference source 63 and a trigger circuit 64 are connected between the DC input power and the chopper 62 so as to provide a stable voltage reference and close frequency control of the trigger circuit 64. As a resut, the frequency control of the chopper 62 is stabilized for varying load conditions. Voltage reference circuit 63 and trigger circuit 64 are of the conventional type such as the previously referenced voltage reference circuit 63 and trigger circuit 64, respectively. The AC output from the chopper 62 is fed to the primary of an ignition coil 66 to greatly increase the voltage. A representative voltage output from the ignition coil would be 13,000 volts.

In operation, as the gaseous propellant enters the engine combustion chamber the gases do not ignite until the chamber pressure reaches a certain low level. At this time, the spark plug 30 arcs to ignite the gases, thereby propagating a self-sustaining flame. This flame stands off downstream from the porous flashback prevention plug 57. Since the spark plugs do not arc in a vacuum, it is possible to use a single high voltage ignition system for a multiple engine arrangement. Thus, the gas flow is actually used to initiate the arcing of the plug. As a result, the ignition system has the advantages of simplicity and reliability.

Porous plug 57 prevents flashback of the flame into the gas generation system by cooling or quenching the flame when it gets too close to the downstream surface thereof. To perform this function, the porous plug 57 is made of heat-conducting material, is in good mechanical contact with the heat sink 59 of the engine and has sufficient structural strength to withstand the shock waves created during gas ignition. One type of porous plug which has been found to be especially suitable is sintered nickel about ⅛ inch thick having a pore size of ten microns to 100 microns. The effect of pore size is to change the pressure drop across the plug and thus, the particular pore size is a matter of choice.

When a signal is given to stop the engine, the solenoid valve 26 is closed and the chopper 62 cut off. The residual propellant entrapped between the solenoid valve and the combustion chamber is rapidly burned to quickly cut off the engine thrust, thereby enabling accurate control of the pulse period (FIG. 3). An advantage of using a gaseous propellant is that there is no dribble of propellant once the solenoid valve is closed, thereby insuring quick pulse cut off. In addition, because of the fixed mixture ratio of the gases generated from water the pulse magnitude is relatively constant and predictable.

Figure 7:
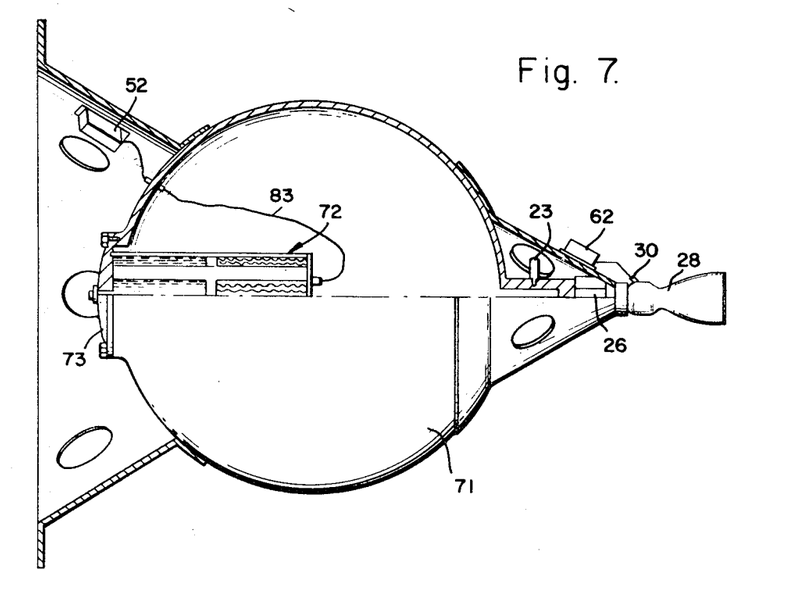
FIG. 7 is a side elevational view partially in cross section of an embodiment of the invention in which an electrolyzer or gas generator within the chamber includes a water absorbent wick which maintains water between a pair of concentric electrolyzing electrodes by means of capillary action.
Figure 8:
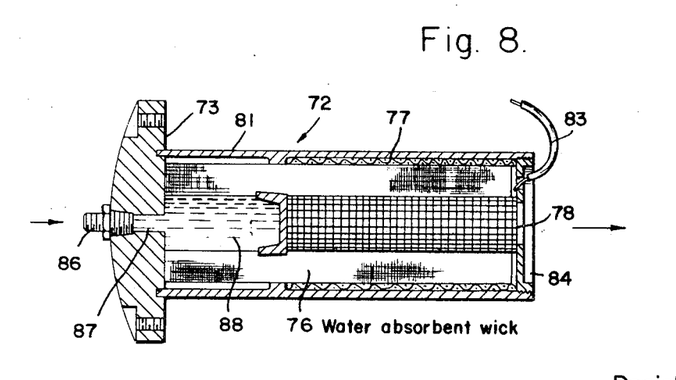
FIG. 8 is an enlarged side cross-sectional view of the electrolysis cell of FIG. 7.

In another embodiment of the invention illustrated in FIGS. 7 and 8, there is no need to spin the storage and electrolysis tanks about a central axis, for example, as in the use of the present invention in a spinning satellite. Where the satellite is spinning, advantage is taken thereof by using centrifugal force to maintain the electrolyzable material in contact with the electrodes and also to ensure separation of the generated gas from the material. Instead, a spherical tank 71 is provided with a cylindrical electrolysis cell 72 connected by a bolted flange 73 to project inwardly from one wall of the chamber 74. In describing this embodiment, it should be understood that there is a certain amount of duplication with the elements of the previously described embodiment. Accordingly, those elements which are similar are identified by the same reference characters throughout the description.

The electrolysis cell 72 is illustrated in more detail in FIG. 8 and has a water absorbent wick 76 inserted between a cathodic grid 77 and an anodic grid 78 to continuously feed water to the surface of these electrodes or grids by capillary action. More specifically, cell 72 includes a hollow cylindrical outer housing 81 which is secured to project from one face of the flange 73. Both the flange 73 and the cylindrical housing 81 are made of electrically-conducting metal and are at the same potential as the tank 71. The cylindrical cathodic grid or cathode 77 is made of nickel wire mesh and is inserted or positioned along the inside wall of the cylindrical housing 81 to provide electrical contact therewith. The hollow cylindrical wick 76 is made of some water-absorbent material of the type which is subject to capillary action, such as asbestos felt or plastic foam. The convoluted anodic grid or anode 78 is made of wire mesh and is mounted adjacent the inner wall of the wick 76. Electrolyzing current is supplied to the anode 78 from the DC-DC power converter 52 by means of a power lead 83 which is insulated from the housing. An apertured cap 84 made of electrically insulating material is threadably connected to the open end of the cylindrical housing 81 to hold the electrodes and wick in place and to allow escape of evolved gas into the chamber 74.

In operation, water enters the electrolysis cell through the threaded nipple 86 and passageway 87 from, for example, a collapsible bladder or container and passes into a water storage chamber 88. The wick 76 is then saturated carrying water into contact with the cathode 77 and anode 78 to form hydrogen gas ($H_2$) at the surface of the cathodic grid 77 and oxygen gas ($O_2$) at the surface of the anodic grid 78. The hydrogen gas escapes along the interspace formed between the cathode grid wires and the housing wall and out through the gas clearance space formed between the wick 76 and the inner face of the cap 84. Oxygen gas ($O_2$) in turn escapes through a hollow interior space formed within the grid wires of anode 78. These gases then escape into the chamber 74 through the apertures in the cap. As the wick tends to dry out in the vicinity of the electrodes additional water is brought into contact with the electrode surfaces by the capillary action of the wick.

The operation of the propulsion system illustrated in FIGS. 7 and 8 is somewhat similar to the operation of the previously described embodiment. As the gas pressure builds up in the spherical chamber 71, the pressure switch 23 is closed to cut off the power supply to the anode, thereby stopping the electrolysis action. When it is desired to obtain thrusting, the solenoid valve 26 is opened to feed gas through a porous plug into the combustion chamber of engine 28. At the same time, the chopper 62 is actuated to supply a high potential AC voltage to the spark plug 30, thereby igniting the gases to obtain a thrust force from the escaping gases.

As stated above the gas generated by electrolysis according to the present invention can be used in the cold gas technique or by burning in the combustion chamber of an appropriate engine. The cold gas technique is known and is used, for example, with nitrogen in the Surveyor attitude control system. An engine for producing thrust in the cold gas technique does not need a combustion chamber or spark plug. A suitable engine 100 is shown in FIG. 3 and consists simply of an exhaust nozzle 102 connected very close to the solenoid actuated valve 26.

The cold gas technique has the advantage over the burning of gases in that it is potentially more reliable. Although the thrust produced by a given quantity of propellant using the cold gas technique is less than that which would be produced by burning the same gases (assuming these gases are burnable), for very long lifetime missions the added reliability of the cold gas technique could justify the additional weight required by its use. The engine 100 shown schematically in FIG. 3 can be any of the well-known reaction engines presently used in the cold gas technique.

When designing a propulsion system which is to use only the cold gas technique, reaction engines such as shown in FIG. 3 would be used. However, if a propulsion system employed a reaction engine as shown in FIG. 1 and if such a system had a fault in the apparatus for burning the gases, such a system could then still be used by employing the cold gas technique. The gases would still flow through porous plug 57 and produce a thrust force. The efficiency would be somewhat less than a system employing an engine such as shown in FIG. 3.

The thrust producing device of the present invention is not limited in use for propelling a spacecraft. It can be used to propel any type of vehicle and can be used to produce a thrust on a stationary body for various purposes. It is especially useful where the vehicle or body is inaccessible and where it is on an extended mission whereby it is necessary to provide a long lasting fuel supply system. Various types of remotely controlled undersea instrument carrying vehicles or bodies have fuel requirements somewhat similar to those of spacecraft. The term "vehicle" as used throughout the present specification and claims is intended to include all such spacecraft, spaceprobes, undersea vehicles, bodies or probes regardless of their movement relative to their immediate surroundings. The present invention is useful on such vehicles to produce a thrust for such purposes, for example, as to reorient or move the vehicle, open a shutter, move a lever, or turn a rotor to generate electricity. In the case where the gas generated by electrolysis is not burned (e.g. in the cases where both hydrogen and oxygen are generated), it is not necessary that all of the gas go to the thrust producing device. For example, the oxygen could be fed to a life support system and only the hydrogen used for thrust. Various eelctrolyzable materials, preferred examples of which have been given above (i.e. water, hydrazine, and hydrogen peroxide) can be used in this invention in the liquid state or even in the solid state. This invention is also useful as a pressurant generator for the expulsion of a liquid propellant. In such a situation, the generated gas communicates with the chamber of a liquid propellant tank to exert a propulsion force on the propellant. An advantage of this type of pressurant generation is that slow leaks are compensated for by the system being able to replenish the lost gases.

While the salient features of the invention have been illustrated and described with respect to particular embodiments it should be readily apparent that numerous modifications may be made within the spirit and scope of the invention and it is therefore not desired to limit the invention to the exact details shown.

What is claimed is:

1. A propulsion system which is capable of operating under zero gravity condition comprising: an electrolysis tank forming an enclosed chamber for storing a quantity of water; an electrode means mounted within the chamber spaced from and electrically insulated from the chamber wall; power means connected to supply electrical current to said electrode at a potential difference relative to the potential of said tank for electrolyzing the water within the chamber whereby oxygen gas and hydrogen gas are evolved; mechanical means connected to said tank for physically separating the water from the gas and maintaining the water in contact with the surfaces of said electrode means; an engine having a combustion chamber formed therein; tube means connected to communicate the enclosed chamber with the combustion chamber of said engine to provide a path for flowing gases thereinto; a porous plug of heat-conducting material secured to said engine adjacent the combustion chamber and across the path of communication of said tube for passing gas to the combustion chamber and preventing flame flashback from the combustion chamber to the electrolysis chamber; and an electrical ignition system having electrodes connected in communication in said combustion chamber for arcing and igniting the gas contained therein.

2. A propulsion system of the type which can operate under weightless conditions for extended periods of time comprising: an electrolysis tank forming an enclosed chamber for storing a quantity of water; an electrode mounted within the chamber spaced from and electrically insulated from the chamber wall; power means connected to supply electrical current to said electrode at a voltage relative to the voltage of said tank for electrolyzing the water within the chamber whereby oxygen gas and hydrogen gas are evolved; mechanical means connected to said tank for physically separating the water from the gas and maintaining the water in contact with the relatively cathodic surfaces created by the potential difference between said electrode and said tank; an engine having a combustion chamber formed therein; tube means connected to communicate the enclosed chamber with the combustion chamber of said engine to provide a path for flowing gases thereinto; a porous plug of heat-conducting material secured to said engine adjacent the combustion chamber and across the path of communication of said tube for passing gas to the combustion chamber and preventing flame flashback from the combustion chamber to the electrolysis chamber; a valve means connected in said tube to selectively block and open the path for flowing gases; and an electrical ignition system having electrodes connected in said combustion chamber for arcing and igniting the gas contained therein.

3. A rocket propulsion system of the type that is operable in a zero gravity field comprising: an electrolysis tank forming an enclosed chamber for storing a quantity of water; an electrode mounted within the chamber spaced from and electrically insulated from the chamber wall; power means connected to supply electrical current to said electrode for electrolyzing the water within the chamber whereby oxygen gas and hydrogen gas are evolved; means connected to centrifugally spin the electrolysis tank to separate the water from the gases such that the water surrounds said electrode; a reaction engine having a combustion chamber formed therein; tube means connected to communicate the enclosed chamber with the combustion chamber of said engine to provide a path for flowing gases thereinto; a porous plug of heat-conducting material secured to said engine adjacent the combustion chamber and across the path of communication of said tube for passing gas to the combustion chamber and preventing flame flashback from the combustion chamber to the electrolysis chamber; and an electrical ignition system having electrodes connected in said combustion chamber for arcing and igniting the gas contained therein.

4. A rocket propulsion system of the type that is operable in zero gravity comprising: an electrolysis tank forming an enclosed chamber for storing a quantity of water; an electrode mounted within the chamber spaced from and electrically insulated from the chamber wall;

power means connected to supply electrical current to said electrode for electrolyzing the water within the chamber whereby oxygen gas and hydrogen gas are evolved; means connected to centrifugally spin the electrolysis tank to separate the water from the gases such that the water surrounds said electrode; a reaction engine having a combustion chamber formed therein; tube means connected between said tank and said engine for communicating the enclosed chamber with the combustion chamber of said engine and providing a path for flowing gases therebetween; a porous plug of heat-conducting material secured to said engine adjacent the combustion chamber and across the path of communication of said tube means for passing gas to the combustion chamber in one direction and preventing flame flashback from the combustion chamber to the electrolysis chamber in the other direction; a valve means connected in said tube to selectively block and open the path of communication for flowing gases; and an electrical ignition system having electrodes connected in said combustion chamber for arcing and igniting the gas contained therein.

5. A propulsion system comprising: an electrolysis tank forming an enclosed chamber; an electrode means mounted within the chamber spaced from and electrically insulated from the chamber wall; electrical power means including a solar cell array connected in circuit with said electrode means to supply electrical power; a control switch means connected between said power source and said electrode for supplying electrolyzing current thereto for generating hydrogen gas and oxygen gas from the water; a pressure-sensitive switch connected in fluid communication with the chamber of said tank whereby said switch is actuated at a predetermined threshold chamber pressure, said pressure-sensitive switch being connected to open said control switch when the fluid pressure of the enclosed chamber exceeds the threshold pressure and to close said control switch when the fluid pressure of the enclosed chamber is less than the threshold pressure; an engine having a combustion chamber formed therein, said engine being connected to said tank in gas communication with the chamber thereof; a control valve connected between said tank and said engine to selectively open and close the path of gas communication therebetween; arc-generating means including electrodes connected to said engine in communication with the combustion chamber thereof; propulsion switch means connected to said control valve and said arc-generating means for simultaneously opening said control valve and energizing said arc-generating means whereby gas flowing into the combustion chamber is ignited; and a porous plug of heat-conducting material secured to said engine adjacent the combustion chamber for passing gas to the combustion chamber and preventing flashback of the gas flame into the chamber of said tank.

6. A rocket propulsion system comprising:
an electrolysis tank forming an enclosed chamber for storing a quantity of water and gas;
an electrolysis electrode means mounted to said tank in gas communication with the chamber;
a solar cell panel for generating electrical power;
an electrolyzing current control switch connected between said solar cell and said electrode for selectively supplying current to the electrode for generating hydrogen gas and oxygen gas from the water;
a pressure-sensitive switch connected to said tank in gas communication with the chamber thereof to be actuated at a predetermined threshold pressure, said pressure-sensitive switch being connected to said electrolyzing current control switch to close said control switch when the gas pressure exceeds the threshold level and to open said control switch when the gas pressure falls below the threshold pressure;
a reaction engine having a combustion chamber, said engine being connected to said tank in gas communication with the enclosed chamber thereof, a gas flow control valve connected between said tank and said reaction engine for selectively opening and closing the path of gas communication therebetween;
a porous plug of heat-conducting material secured to said engine adjacent and downstream of the combustion chamber and across the path of gas communication between the chamber and said engine;
a spark-generating means including electrodes connected to said engine in communication with the combustion chamber thereof;
and a propulsion control switch connected to said control valve and said spark-generating means for simultaneous energizing or de-energizing said gas flow control valve and spark-generating means for igniting or turning off the propelling force respectively.

7. A thrust producing apparatus comprising:
a tank connected and adapted to contain a liquid propellant from which gas can be generated by passing an electrolytic current therethrough;
means for electrolyzing said propellant to generate gas;
means for receiving said generated gas and for storing it under pressure;
means for stopping said electrolysis when the pressure of said stored gas reaches a predetermined pressure;
a first thrust producing engine adapted for use with said liquid propellant to produce thrust;
feed lines means connected between said tank and said first engine for feeding said liquid propellant to said engine;
valve means in said feed line means for controllably feeding said liquid propellant to said first engine;
a second thrust producing engine adapted for use with said generated gas to produce thrust;
gas feed line means connected between said receiving and storing means and said second engine for providing gas communication therebetween; and
valve means in said gas feed line for controllably feeding said generated gas to said second engine.

8. The apparatus according to claim 7 including:
means for providing gaseous communication between said generated gas and said liquid propellant whereby said liquid propellant is fed to said first engine under pressure of said generated gas.

9. A thrust producing apparatus comprising:
a tank adapted to contain a quantity of hydrazine;
means for electrolyzing said hydrazine to generate gas;
means for receiving and storing said generated gas under pressure;
means for stopping the said electrolysis of said hydrazine when the pressure of said generated gas reaches a predetermined pressure;
a liquid hydrazine engine;
feed line means connected between said tank and said engine for feeding said liquid hydrazine to said engine;
valve means in said feed line means for controllably feeding said liquid hydrazine to said engine;
a gas engine adapted for use with said generated gas to produce thrust;
gas feed line means connected between said receiving and storing means and said gas engine for providing gas communication therebetween; and
valve means in said gas feed line for controllably feeding said generated gas to said gas engine.

10. A thrust producing apparatus comprising:
a tank adapted to contain a quantity of liquid material from which gas can be generated by passing an electrolytic current therethrough;
means for electrolyzing said material to generate gas;
means for receiving and storing said generated gas under pressure;
means for stopping said electrolysis when the pressure of said generated gas reaches a predetermined pressure;

an engine adapted for use with said generated gas to produce thrust;

a feed line connected between said receiving and storing means and said engine to provide gas communication therebetween;

valve means in said feed line for controllably feeding said generated gas to said engine; and means for centrifugally maintaining said material in contact with said electrolyzing means whereby the centrifugal force also effects centrifugal separation of the generated gas from said material.

References Cited

UNITED STATES PATENTS

| | | |
|---|---|---|
| 1,281,962 | 10/1918 | Holland. |
| 1,581,944 | 4/1926 | Hausmeister _________ 204—129 |
| 1,905,627 | 4/1933 | Holland. |
| 2,098,629 | 11/1937 | Knowlton _______ 204—129 XR |
| 2,140,516 | 12/1938 | Cowan _____________ 219—274 |
| 2,519,515 | 8/1950 | Turner _____________ 219—274 |
| 2,551,112 | 5/1951 | Goddard __________ 60—39.11 |
| 2,864,879 | 12/1958 | Toulmin ____________ 136—206 |
| 2,898,978 | 8/1959 | Kitchen et al. __ 60—39.11 XR |
| 3,038,853 | 6/1962 | Cole ___________ 204—129 XR |
| 3,216,674 | 11/1965 | McLean. |
| 3,224,189 | 12/1965 | Kenney ____________ 60—204 |
| 3,262,872 | 7/1966 | Rhodes et al. _____ 204—129 XR |

CARLTON R. CROYLE, Primary Examiner

U.S. Cl. X.R.

60—26, 39.11, 39.18, 217, 225, 229, 240; 204—129